(12) United States Patent
Nishizawa et al.

(10) Patent No.: US 6,295,084 B1
(45) Date of Patent: Sep. 25, 2001

(54) SYSTEM WITH ANALOG INTERFACE AND SIGNAL PROCESSOR THEREFOR

(75) Inventors: Akihito Nishizawa, Yokosuka; Toshiro Kinugasa, Hiratsuka, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/894,634

(22) PCT Filed: Mar. 10, 1995

(86) PCT No.: PCT/JP95/00401

§ 371 Date: Aug. 25, 1997

§ 102(e) Date: Aug. 25, 1997

(87) PCT Pub. No.: WO96/28930

PCT Pub. Date: Sep. 19, 1996

(51) Int. Cl.[7] .................................................. H04N 5/232
(52) U.S. Cl. ............................................. 348/211; 348/207
(58) Field of Search ................................... 348/207, 222, 348/211, 212, 213, 233, 312, 552, 558, 706, 709, 705, 159, 239; 386/38, 44, 46; 358/906, 909.1

(56) References Cited

U.S. PATENT DOCUMENTS

| | | | |
|---|---|---|---|
| 5,134,487 | * 7/1992 | Taguchi et al. | 358/906 |
| 5,287,171 | 2/1994 | Ohtsubo . | |
| 5,471,241 | * 11/1995 | Hieda | 348/222 |
| 5,475,441 | * 12/1995 | Parulski et al. | 348/552 |
| 5,483,280 | * 1/1996 | Takahashi et al. | 348/296 |
| 5,486,853 | * 1/1996 | Baxter et al. | 348/222 |
| 5,493,332 | * 2/1996 | Dalton et al. | 348/207 |
| 5,502,487 | * 3/1996 | Choi | 348/222 |
| 5,552,826 | * 9/1996 | Hieda et al. | 348/222 |
| 5,570,128 | * 10/1996 | Kawahara | 348/222 |
| 5,602,580 | * 2/1997 | Tseng | 348/17 |
| 5,617,138 | * 4/1997 | Ito et al. | 348/222 |
| 5,631,701 | * 5/1997 | Miyake | 348/552 |
| 5,748,307 | * 5/1998 | Nakamura et al. | 348/222 |
| 5,930,443 | * 7/1999 | Koyama et al. | 348/207 |
| 6,091,880 | * 7/2000 | Hatae et al. | 386/38 |

FOREIGN PATENT DOCUMENTS

| | | |
|---|---|---|
| 483745A | 5/1992 | (EP) . |
| 60-150857 | 10/1985 | (JP) . |
| 1-264490 | 10/1989 | (JP) . |
| 1-268280 | 10/1989 | (JP) . |
| 2-127871 | 5/1990 | (JP) . |
| 3-7491 | 1/1991 | (JP) . |
| 4-67794 | 3/1992 | (JP) . |
| 4-144383 | 5/1992 | (JP) . |
| 4-175075 | 6/1992 | (JP) . |
| 5-325067 | 12/1993 | (JP) . |

OTHER PUBLICATIONS

"CCD Micro–Miniature Color Camera", IEEE Trans., CE–33,2, p. 85, 1987.

* cited by examiner

Primary Examiner—Wendy R. Garber
Assistant Examiner—Aung S. Moe
(74) Attorney, Agent, or Firm—Antonelli, Terry, Stout & Kraus, LLP

(57) ABSTRACT

A camera system having an analog interface through which any one of camera head units can be selectively connected to a chrominance/luminance signal generator unit. The camera head unit includes an image pickup device, a drive circuit, and a synchronizing signal generator circuit. The chrominance/luminance signal generator unit includes a camera processor circuit, a Y/C separation/demodulation circuit, and a signal identifying circuit. Synchronizing signals are added to the output signal from the camera head unit, and used for the kinds of signal to be discriminated. The camera processor and the Y/C separator/demodulator are switched in response to the results from the identifying circuit. Therefore, the signals from a plurality of camera head units can be switched and processed by a single signal processor, or chrominance/luminance signal generator unit.

15 Claims, 7 Drawing Sheets

SYSTEM WITH ANALOG INTERFACE AND SIGNAL PROCESSOR THEREFOR

TECHNICAL FIELD

The present invention relates to a solid-state camera system, and particularly to a camera and its signal processor having a camera head unit and a chrominance/luminance signal generator unit connected through an extended cable to the camera head unit.

BACKGROUND ART

The conventional camera system is always used in a combination of a housing, or unit including a signal processor (hereinafter, referred to as a chrominance/luminance signal generator unit) and another housing, or unit including an image pickup device (hereinafter, referred to as a camera head unit) as described in "CCD Micro-Miniature Color Camera", IEEE Trans., CE-33,2, p. 85 (1987).

In the prior art, since the camera head unit and the chrominance/luminance signal generator unit can be placed away from to each other through an extended cable, even when the chrominance/luminance signal generator unit is incorporated in a personal computer, the camera head unit can be used out of the personal computer since it is not fixed to the computer. Therefore, the camera head can be directed at any angle. However, when a plurality of cameras are used to supply video data to the personal computer or the like in a time sharing manner, it is necessary to incorporate in the personal computer the chrominance/luminance signal generators of which the number is the same as that of the camera head units, thus increasing the cost. The conventional camera system does not consider this aspect.

DISCLOSURE OF INVENTION

An object of the present invention is to provide a camera system having a novel analog interface through which the camera head unit can be freely interchanged by another. In order to achieve the above object, according to the camera system of the present invention, a synchronizing signal is added to the output signal from the camera head unit. If a synchronizing signal is added to the output signal from the camera head unit as in the standard analog interface, the output signal from the image pickup device can be handled in the same way as the television signal of NTSC, PAL or the like. Thus, a plurality of camera head units can be connected to a single chrominance/luminance signal generator unit and also freely interchanged with other ones. Hence, since each camera head is not necessary to be connected to its own signal processor, the circuit scale can be decreased, resulting in remarkable cost reduction.

In addition, the camera system having the above novel analog interface is required to use with a VTR and a camcorder, or camera/VTR which reproduce NTSC/PAL television signals or the like. In this case, since the user needs to discriminate the television signal and the signal from the camera head, there is a new drawback that it is not convenient to use. To solve this problem, the invention is to provide a camera system capable of equally handling both the signal from the camera head and the television signal.

In order to achieve the above object, according to the invention, there is provided a camera system that has a camera head unit including at least an image pickup device, a timing generator circuit for driving the image pickup device, a synchronizing signal generator circuit for generating synchronizing signals in accordance with a timing signal from the timing generator circuit, an adder circuit for adding the synchronizing signals from the synchronizing signal generator circuit to the output signal from the image pickup device, and output means for producing in a dot-sequential manner the signal that is generated from the image pickup device and added with the synchronizing signals; a chrominance/luminance signal generator unit including at least input means for receiving a signal from the outside, an identifying circuit for deciding whether the signal received through the input means is a television signal or the output signal from the camera head unit, a camera signal processor circuit for generating the chrominance signal and luminance signal of the output signal from the camera unit, a Y/C separation/demodulation processor circuit for generating the chrominance signal and luminance signal of the television signal, and a switching circuit for switching the camera signal processor and the Y/C separation/demodulation processor in accordance with the result from the identifying circuit; and a connector unit that can detachably connect the camera head unit and the chrominance/luminance signal generator unit and transmit both television signal and the signal from the camera head unit to the chrominance/luminance signal generator unit. When the result from the identifying circuit indicates the signal from the camera head unit, it is processed by the camera signal processor circuit. When the result indicates the television signal from a VTR or from a camcorder, or a camera/VTR, it is processed by the Y/C separation/demodulation processor circuit. Therefore, since the television signal and the output signal from the camera head unit can be automatically discriminated by use of the added synchronizing signals, those signals can be received through the same input terminal. Thus, since the user only connects a camera head unit or other apparatus to the chrominance/luminance signal generator unit without knowing the kind of signal, it is easy to manipulate the camera system, and erroneous operation due to misconnection can be suppressed.

BEST MODE FOR CARRYING OUT THE INVENTION

Figure 1:
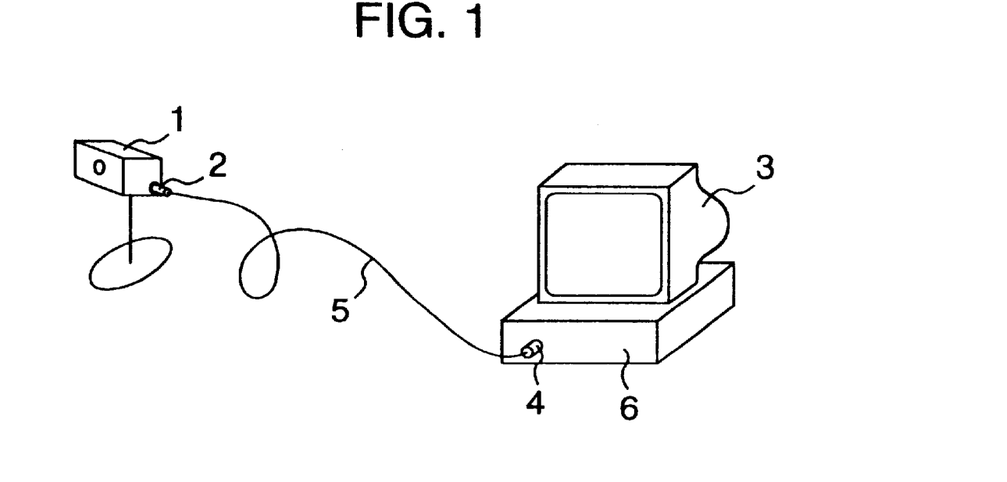
FIG. 1 is a general view of the whole structure of an embodiment of the invention.
Figure 4A:
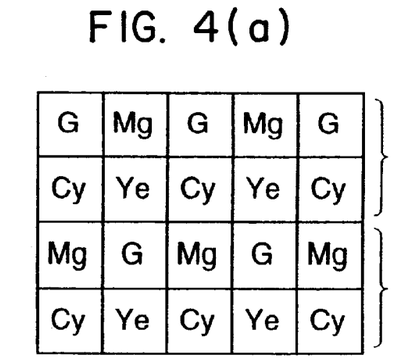
FIGS. 4(a) and 4(b) shows examples of the output signal from the camera head, with a mixture of pixels shown at FIG. 4(a), the 10 output signal from the camera head shown at FIG. 4(b).
Figure 4B:
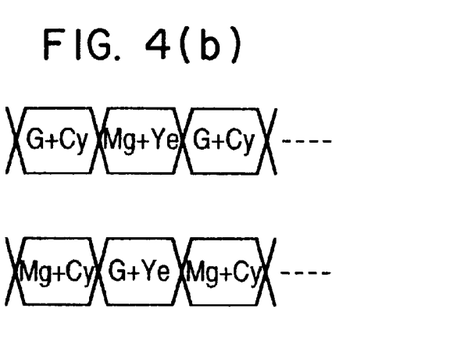
Figure 5:
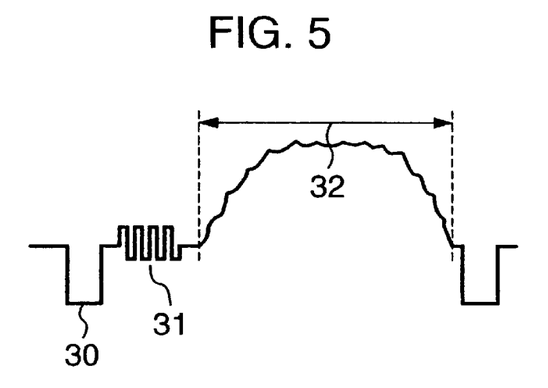
FIG. 5 shows an example of the output signal with a synchronizing signal added to the signal from the camera head illustrated in FIG. 1.

The first embodiment of the invention will be described with reference to FIGS. 1, 2, 3, 4 and 5. FIG. 1 shows one embodiment of the whole construction of the invention, FIG. 2 shows an example of the camera head unit in the embodiment illustrated in FIG. 1, FIG. 3 shows an example of the signal processor portion in the embodiment illustrated in FIG. 1, and FIGS. 4 and 5 are diagrams useful for explaining the output signal from the camera head unit illustrated in FIG. 1.

The camera system of this embodiment includes, as shown in FIG. 1, a camera head unit 1, a signal output terminal 2 of the camera head unit 1, a cable 5, a chrominance/luminance signal generator unit 6, a signal input terminal 4 of the chrominance/luminance signal generator unit 6, and a monitor 3. The signal output terminal 2 of the camera head unit 1 is connected to the signal input terminal 4 of the chrominance/luminance signal generator unit 6 through the cable 5, and the signal generated from the chrominance/luminance signal generator unit 6 is displayed on the monitor 3.

Figure 2:
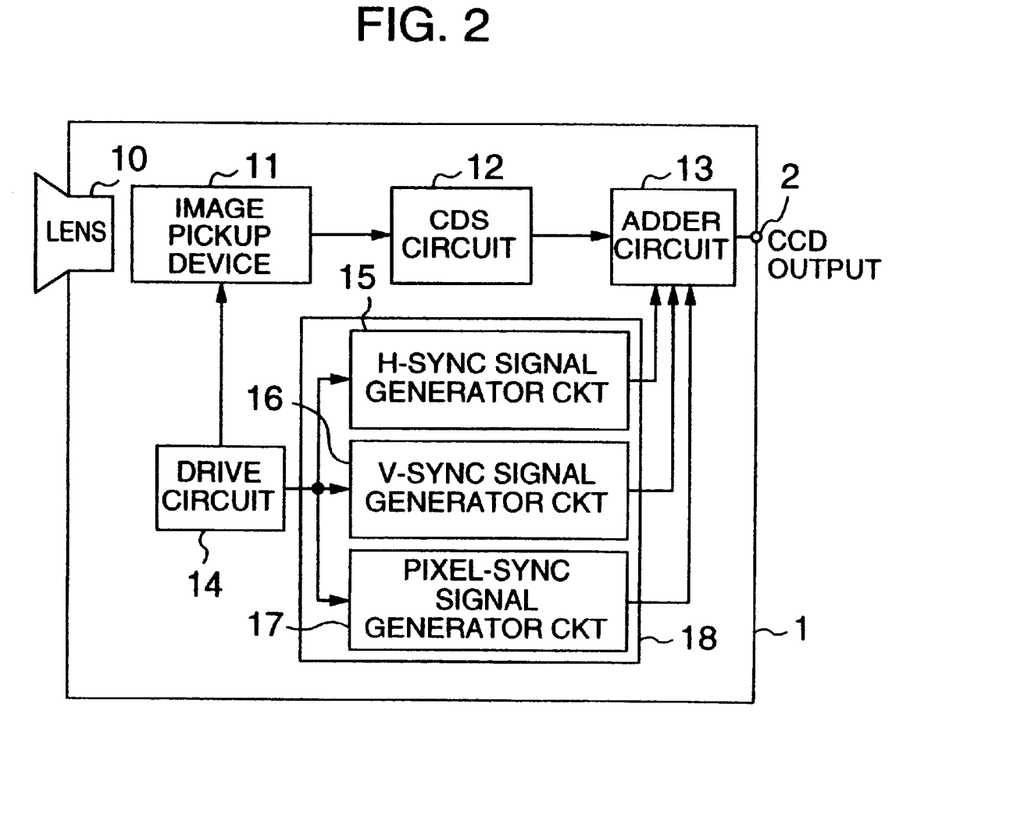
FIG. 2 is a block diagram of an example of the structure of the camera head unit shown in FIG. 1.

The camera head unit 1 includes, as shown in FIG. 2, a lens 10, an image pickup device 11, a CDS (Correctuve Double Sampling) circuit 12, a drive circuit 14 for generating a timing signal for driving the image pickup device, a synchronizing signal generator circuit 18 having a horizontal synchronizing signal generator circuit 15, a vertical synchronizing signal generator circuit 16 and a pixel synchronizing signal generator circuit 17, and an adder circuit 13 for adding the synchronizing signals from the synchronizing signal generator circuit 18 to the output signal from the image pickup device 11. The output end of the image pickup device 11 is connected to the input end of the CDS circuit 12, the output end of the CDS circuit 12 to one of the four input ends of the adder circuit 13, the output end of the adder circuit 13 to the signal output terminal 2 of the camera head unit 1, one end of the two output ends of the drive circuit 14 to the image pickup device 11, the other end to the input ends of the horizontal synchronizing signal generator circuit 15, vertical synchronizing signal generator circuit 16 and pixel synchronizing signal generator circuit 17, and the output ends of the horizontal synchronizing signal generator circuit 15, vertical synchronizing signal generator circuit 16 and pixel synchronizing signal generator circuit 17 to the input ends of the adder circuit 13.

Figure 3:
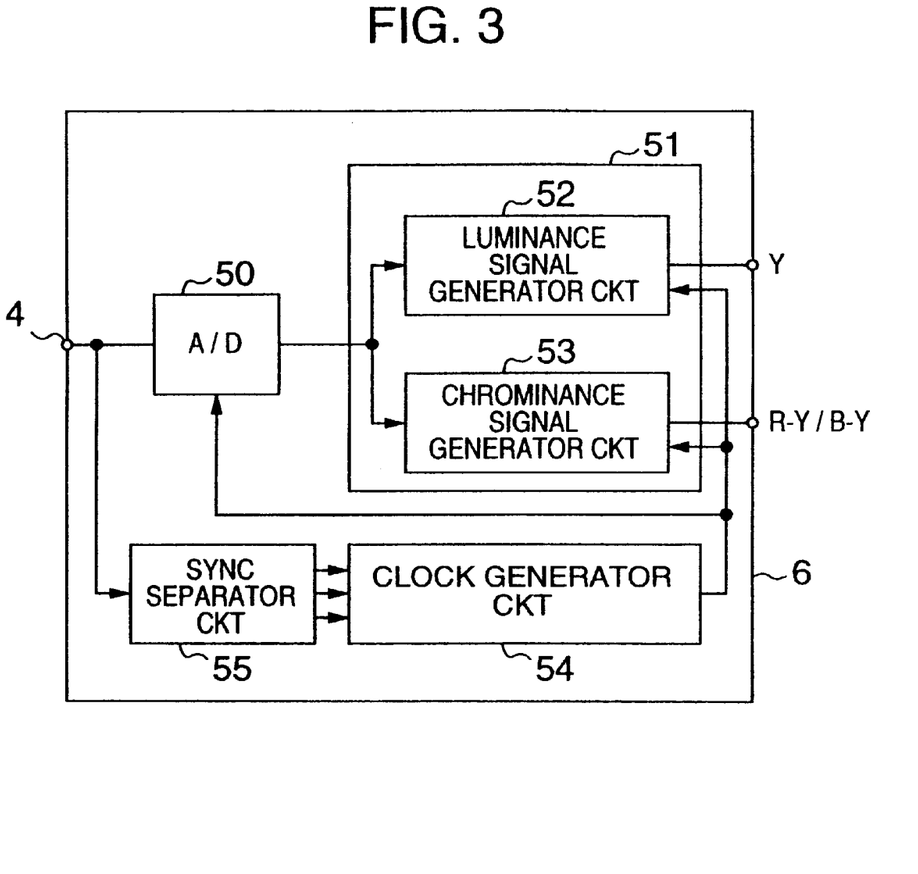
FIG. 3 is a block diagram of an example of the structure of the chrominance/luminance signal generator unit shown in FIG. 1.

The chrominance/luminance signal generator unit 6 includes, as shown in FIG. 3, an A/D converter circuit 50, a camera signal processor circuit 51 having a chrominance signal generator circuit 53 and a luminance signal generator circuit 52, a synchronizing signal separator circuit 55, and a clock generator circuit 54. The signal input terminal 4 is connected to the input ends of the A/D converter circuit 50 and synchronizing signal separator circuit 55, the output end of the synchronizing signal separator circuit 55 to the input end of the clock generator circuit 54, the output end of the clock generator circuit 54 to the clock input ends of the chrominance signal generator circuit 53, luminance signal generator circuit 52 and A/D converter circuit 50, and the output end of the A/D converter circuit 50 to the input ends of the chrominance signal generator circuit 53 and the luminance signal generator circuit 52.

In this embodiment, the light incident to the lens 10 is converted into an electric signal by the image pickup device 11, and this signal is processed by the CDS circuit 12 so that the noise can be reduced. The synchronizing signal generator circuit 18 divides the frequency of a pulse signal from the drive circuit 14, and generates a horizontal synchronizing signal that once turns Low level in part of the horizontal blanking period, a vertical synchronizing signal that turns Low level several times in part of the vertical blanking period, and a pixel synchronizing signal that repetitively turns High level and Low level several times with the pixel period of the image pickup device in part of the horizontal blanking period. The adder circuit 13 adds the synchronizing signals from the synchronizing signal generator circuit 18 to the noise-reduced signal from the CDS circuit 12, and supplies its output signal to the signal output terminal 2 of the camera head unit 1. When an image pickup device of such pixel array as shown in FIG. 4(a) is used for the image pickup device 11, the camera head unit 1 produces an output signal that has the synchronizing signals, as illustrated in FIG. 5, added to the dot-sequential signals of (G+Cy)and (Mg+Ye),and (Mg+Cy) and (G+Ye) as illustrated in FIG. 4(b). In FIG. 5, 30 represents the horizontal synchronizing signal, 31 the pixel synchronizing signal, and 32 the output signal from the image pickup device. Also, in the chrominance/luminance signal generator unit 6, the synchronizing signal separator circuit 55 separates the synchronizing signal components from the output signal which the camera head unit 1 produces, and the clock generator circuit 54 generates a clock on the basis of the synchronizing signal components. The A/D converter circuit 50 operates in synchronism with the clock, converting the output signal from the camera head unit 1 into a digital signal. The chrominance signal generator circuit 53 and luminance signal generator 52 process the digital signal to generate two color difference signals and the luminance signal. The signals generated from the chrominance/luminance signal generator unit 6 are properly processed so that the video signal can be displayed on the monitor 3.

In this embodiment, since the synchronizing signal components are added to the output signal from the camera head unit 1, the signal processing in the camera head unit 1 can be performed completely independently of that in the chrominance/luminance signal generator unit 6. Thus, a plurality of camera heads or different types of camera heads can be connected freely to the chrominance/luminance signal generator unit 6. Therefore, each camera head unit does not need to have its own signal processor, so that the circuit scale and cost can be reduced. In addition, since the chrominance/luminance signal generator unit 6 can generate all the necessary clocks from the synchronizing signals added in the camera head unit, it is possible to decrease the number of signal lines that are connected between the camera head unit 1 and the chrominance/luminance signal generator unit 6. Moreover, the correct pixel position for each color can be found by utilizing the pixel synchronizing signal that is the synchronizing signal with the pixel period, and thus colors can be correctly separated.

Figure 6:
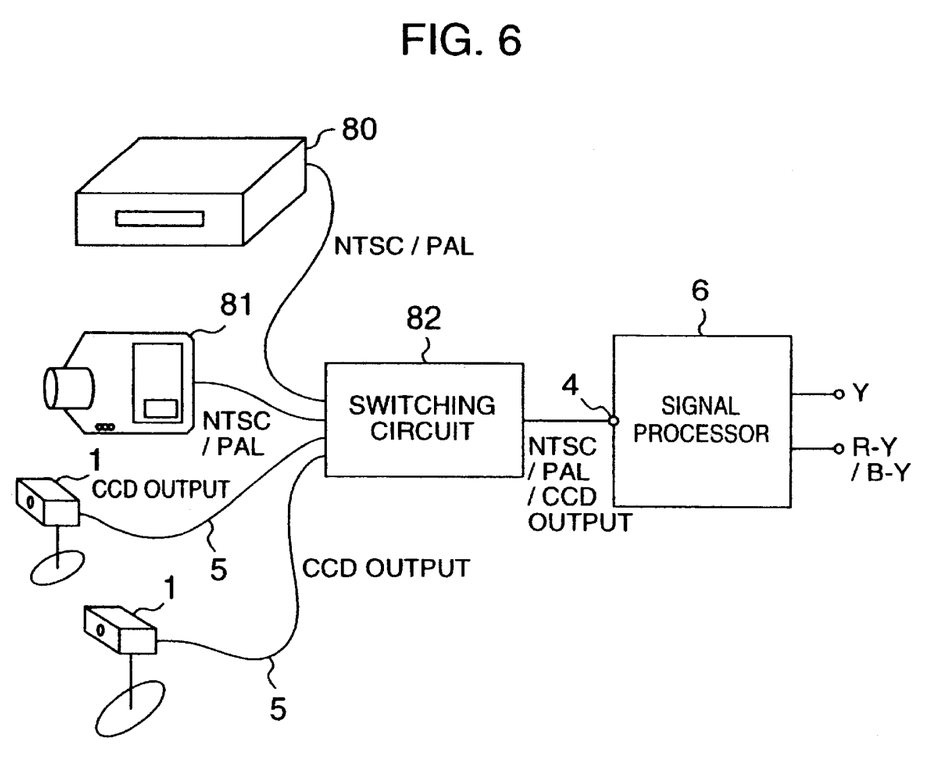
FIG. 6 shows an example of the whole structure of another embodiment of the invention.
Figure 7:
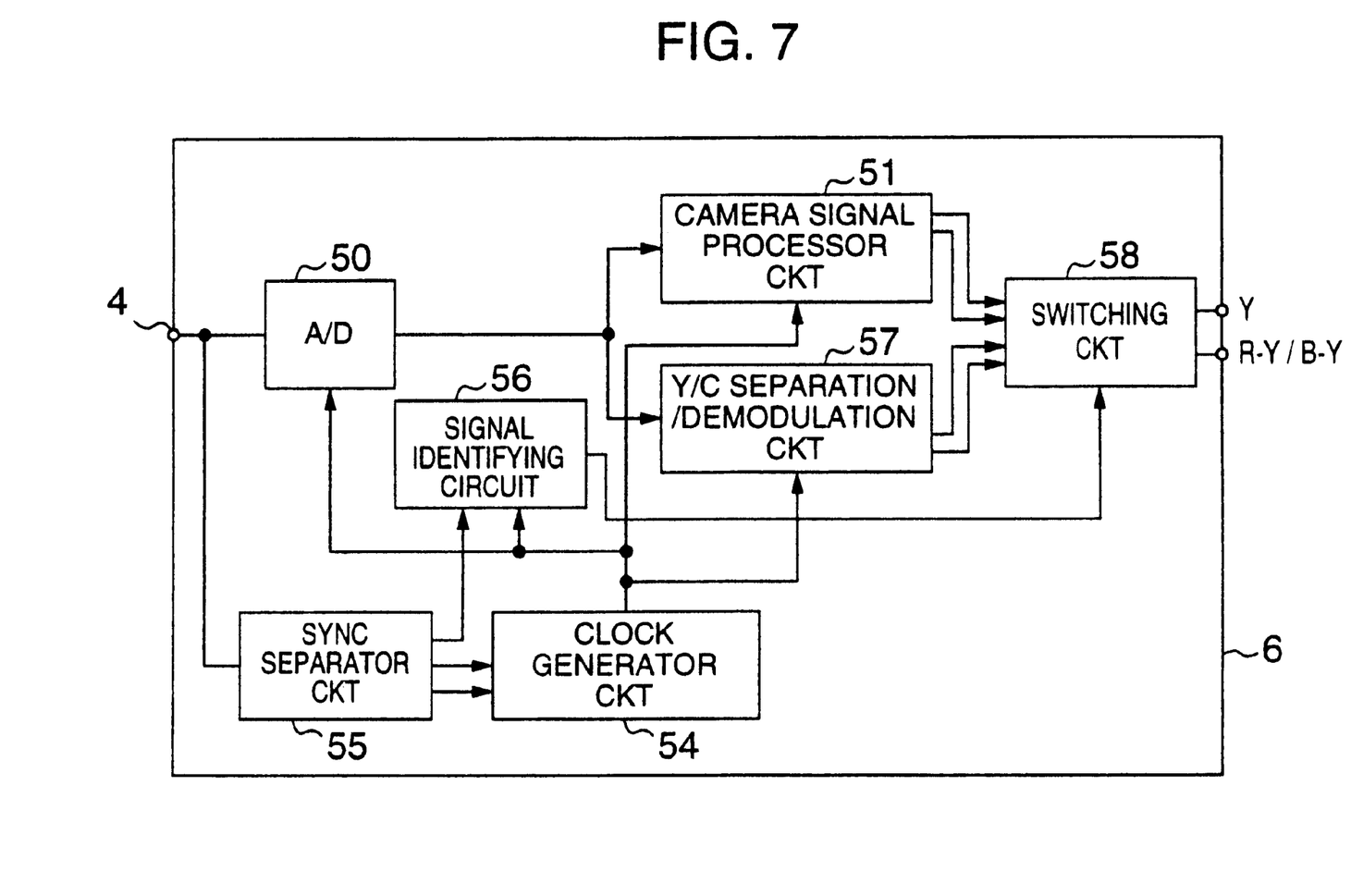
FIG. 7 is a block diagram of another example of the structure of the chrominance/luminance signal generator unit shown in FIG. 6.
Figure 10A:
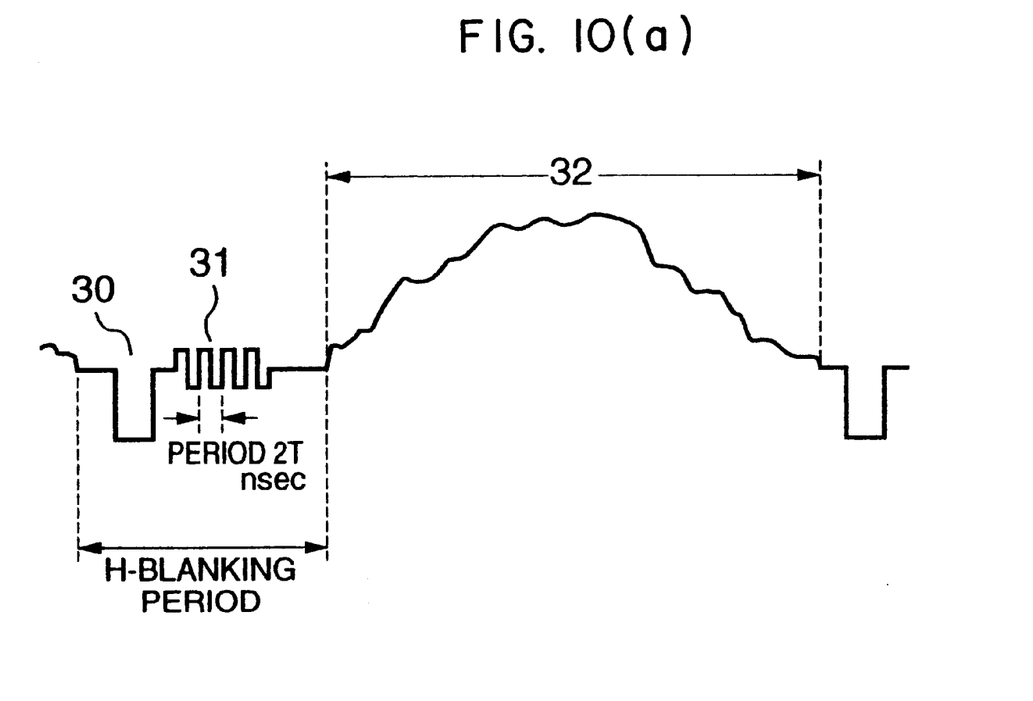
FIGS. 10(a) and 10(b) show examples of the horizontal sampling period and pixel synchronizing signal period in the image pickup device, with the output signal from the camera head unit shown at FIG. 10(a), the pixel-mixture image pickup device shown at FIG. 10(b).
Figure 10B:
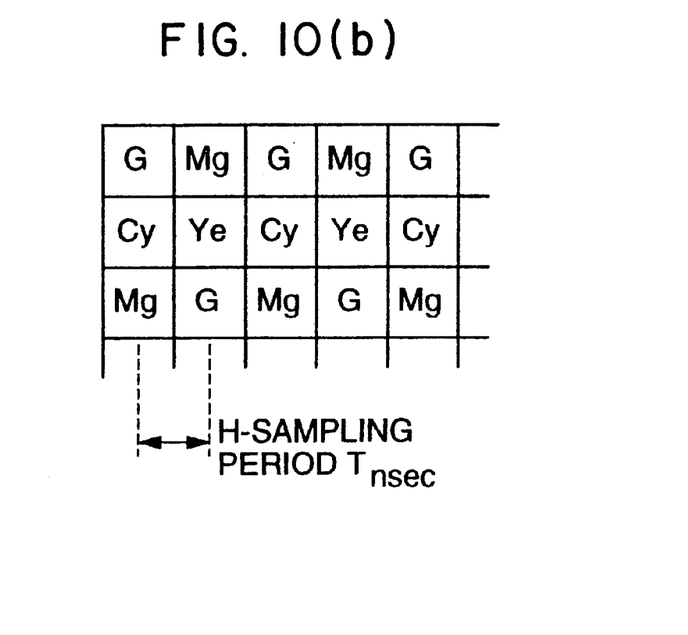

The second embodiment of the invention will be described with reference to FIGS. 6, 7, 10(a) and 10(b). FIG. 7 shows the whole system of another embodiment of the invention, FIG. 7 is a block diagram of the chrominance/luminance generator unit 6 in the embodiment of FIG. 6, and FIGS. 10(a) and 10(b) show examples of the horizontal sampling period and pixel synchronizing signal period of the image pickup device. In this embodiment, like elements corresponding to those in the first embodiment are identified by the same reference numerals, and will not be described.

The camera system of this embodiment includes two camera head units 1, a camcorder, or camera/VTR 81, a VTR 80, a switching circuit 82, and the chrominance/luminance signal generator unit 6. The signal from any one of the two camera head units 1, camera/VTR 81 and VTR 80 is selected by the switching circuit 82, and supplied to the chrominance/luminance signal generator unit 6. The switching circuit 82 enables a desired signal to be selected from a plurality of camera head units, VTR and so on which are all connected to the switching circuit, and data to be acquired in a time-sharing manner. The two camera head units 1 have the same structure as in the embodiment of FIG. 2. The chrominance/luminance signal generator unit 6 includes a signal identifying circuit 56, a Y/C separation/demodulation circuit 57 and another switching circuit 58 in addition to the elements of the unit of FIG. 3. That is, the chrominance/luminance signal generator unit 6 includes the A/D converter circuit 50, the camera signal processor circuit 51, the Y/C separation/demodulation circuit 57, the switching circuit 58, the signal identifying circuit 56, the synchronizing signal separator circuit 55 and the clock generator circuit 54. The signal input terminal 4 is connected to the input ends of the A/D converter circuit 50 and synchronizing signal separator circuit 55, and the output end of the synchronizing signal separator circuit 55 is connected to the input ends of the clock generator circuit 54 and signal identifying circuit 56. The output end of the clock generator circuit 54 is connected to the clock input ends of the camera signal processor circuit 51, Y/C separation/demodulation circuit 57, signal identifying circuit 56 and A/D converter circuit 50. The output end of the A/D converter circuit 50 is connected to the signal input ends of the camera signal processor circuit 51 and Y/C separation/demodulation circuit 57. The output signals from the camera signal processor circuit 51 and Y/C separation/demodulation circuit 57 are switched by the switching circuit 58 in response to the results from the signal identifying circuit 56. While in this embodiment the output signals are switched by the switching circuit 58, the switching circuit may be provided before the camera signal processor circuit 51 and Y/C separation/demodulation circuit 57 so that the input signals to the camera signal processor circuit 51 and Y/C separation/demodulation circuit 57 can be switched by it.

In this embodiment, the signal identifying circuit 56 discriminates the kind of the input signal from the pixel synchronizing signal or color burst signal. When the output signal from the camera head unit 1 is supplied to the chrominance/luminance generator circuit 6, the camera signal processor circuit 51 generates the luminance signal and two color difference signals. When a television signal is supplied from the camera/VTR or VTR, the Y/C separation/demodulation circuit 57 separates the input signal into the luminance signal and the modulated chrominance signal, and then demodulates the modulated chrominance signal into two color difference signals of base bands.

The pixel synchronizing signal is located in the horizontal blanking period as shown in FIGS. 10(a) and 10(b), and it has twice the horizontal sampling period T of the image pickup device, or a period of 2T. The image pickup device is selected such that the period 2T is not equal to the period of the color burst signal, or the period of the chrominance subcarrier.

In this embodiment, since the signal identifying circuit 56 discriminates between the television signal and the signal from the camera head unit 1 on the basis of the pixel synchronizing signal or the frequency of color burst portion, and controls the chrominance/luminance signal generator unit 6 to change its processing operation, the correct luminance signal and color difference signals can always be generated without dependence on the input signal. In addition, since different kinds of signal can be supplied through a single input terminal, the user does not need to discriminate between the television signal and the signal from the camera head unit, but simply connects the apparatus. Moreover, since erroneous operation is never caused by misconnection, the convenience of operation can be improved.

Also, if the switching circuits are provided to allow a plurality of camera head units to be freely connected, there is no need to provide a plurality of signal processors after the camera head units, or a plurality of camera head units can be connected to a single chrominance/luminance signal generator unit through the change-over switch. In other words, data can be handled in a time-sharing manner by a single signal processor portion. Therefore, since the number of signal processor circuits can be decreased, the circuit scale and cost can be reduced.

This embodiment has substantially the same effect as the first embodiment.

Figure 8:
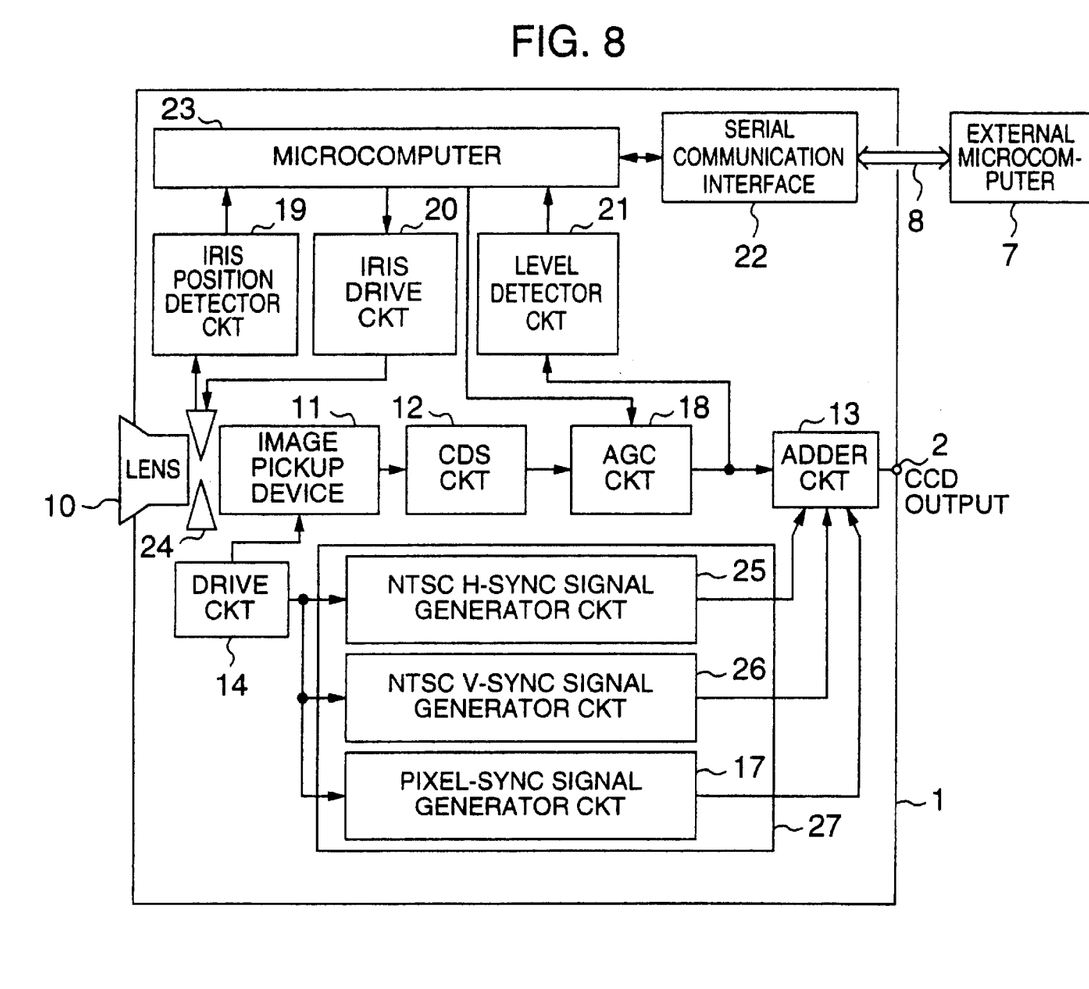
FIG. 8 is a block diagram of another example of the camera head unit in FIGS. 1 and 6.

The third embodiment of the invention will be described with reference to FIG. 8. This embodiment concerns a modification of the camera head unit 1 of the first and second embodiments. In this embodiment, like elements corresponding to those in the first embodiment are identified by the same reference numerals, and will not be described.

The camera head unit 1 of this embodiment includes the lens 10, the image pickup device 11, the CDS circuit 12, an AGC (Auto Gain Control) circuit 18 for controlling the signal gain, the adder circuit 13, the drive circuit 14, a synchronizing signal generator circuit 27 having an NTSC horizontal synchronizing signal generator circuit 25, an NTSC vertical synchronizing signal generator circuit 26 and the pixel synchronizing signal generator circuit 17, an iris 24, an iris position detector circuit 19, an iris drive circuit 20, a level detector circuit 21, a microcomputer 23, a serial communication interface 22, and an external microcomputer 7. The output end of the image pickup device 11 is connected to the input end of the CDS circuit 12, the output end of the CDS circuit 12 to the input end of the AGC circuit 18, and the output end of the AGC circuit 18 to the input end of the level detector circuit 21 and to one of the four input ends of the adder circuit 13. The output end of the adder circuit 13 is connected to the signal output terminal 2 of the camera head unit 1, one of the two output ends of the drive circuit 14 to the input end of the image pickup device 11, and the other one to the input ends of the NTSC horizontal synchronizing signal generator circuit 25, NTSC vertical synchronizing signal generator circuit 26 and pixel synchronizing signal generator circuit 17. The output ends of the NTSC horizontal synchronizing signal generator circuit 15, NTSC vertical synchronizing signal generator circuit 16 and pixel synchronizing signal generator circuit 17 are connected to the input ends of the adder circuit 13. The output ends of the level detector circuit 21 and iris position detector circuit 19 are connected to the microcomputer 23, and the microcomputer 23 is also connected to the AGC circuit 18 and iris drive circuit 20 to control the iris through them. In addition, the microcomputer 23 is connected to the serial communication interface 22 so as to bidirectionally communicate with the external microcomputer 7 through the interface.

In this embodiment, the light incident to the lens 10 is converted into an electric signal by the image pickup device 11, and processed by the CDS circuit 12 so that the nose can be reduced. Then, the output signal from the CDS circuit 12 is fed to the AGC circuit 18. The gain in the AGC circuit is controlled by the microcomputer on the basis of the state of iris 24 detected by the iris position detector circuit 19 and the signal level detected by the level detector circuit 21, so that the level of the output signal from the camera head unit 1 can be maintained constant. The adder circuit 13 adds the output signal from the AGC circuit 18 to the horizontal and vertical synchronizing signals and the pixel synchronizing signal which meet the specifications of the NTSC system, and supplies the resulting signal to the signal output terminal 2 of the camera head 1.

In this embodiment, since the microcomputer 23 can communicate through the serial communication interface 22 with the external microcomputer 7 provided on the outside of the camera head unit 1, an output signal which meets the specifications of the connected signal processor circuit can be produced under the external control. In addition, by adjusting the AGC circuit 18 and the degree of iris 24 and not adding the pixel synchronizing signal so that the level of the output signal from the camera head unit 1 meets the NTSC system, it is possible to connect the camera head unit to the NTSC system television monitor and use it as a black-and-white camera. This embodiment has substantially the same effect as the first embodiment. Moreover, if the levels of the synchronizing signals are made to coincide with those of the standard television signal, it is possible to use an inexpensive synchronizing signal separator LSI.

Figure 9:
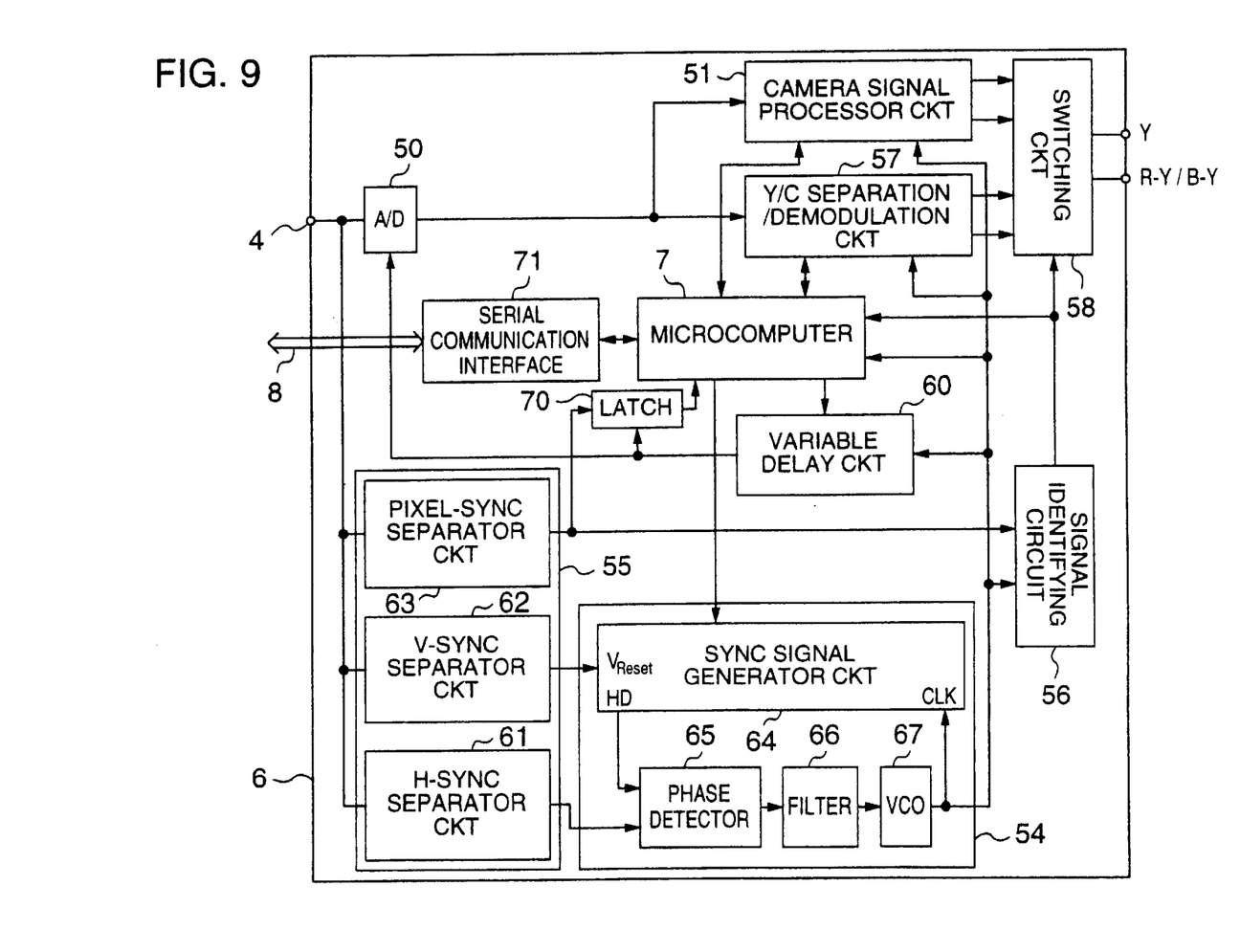
FIG. 9 is a block diagram of still another example of the chrominance/luminance signal generator unit in FIGS. 1 and 6.

The fourth embodiment of the invention will be described with reference to FIG. 9. FIG. 9 is a block diagram of a modification of the chrominance/luminance signal generator unit 6 in the first and second embodiments. In this embodiment, like elements corresponding to those in the first, second and third embodiments are identified by the same reference numerals, and will not be described.

The chrominance/luminance signal generator unit of this embodiment includes the A/D converter circuit 50, the camera signal processor circuit 51, the Y/C separation/demodulation circuit 57, the switching circuit 58, the signal identifying circuit 56, the synchronizing signal separator circuit 55 having a horizontal synchronizing signal separator circuit 61, a vertical synchronizing signal separator circuit 62 and a pixel synchronizing signal separator circuit 63, the clock generator circuit 54 having a synchronizing signal generator circuit 64, a phase detector 65, a filter 66 and a VCO (Voltage Controlled Oscillator) 67, a serial communication interface 71, the microcomputer 7, a latch 70, and a variable delay circuit 60. The signal input terminal 4 is connected to the input ends of the A/D converter circuit 50, horizontal synchronizing signal separator circuit 61, vertical synchronizing signal separator circuit 62 and pixel synchronizing signal separator circuit 63. The output end of the horizontal synchronizing signal separator circuit 61 is connected to one of the two input ends of the phase detector 65, and the output end of the vertical synchronizing signal separator circuit 62 to the vertical reset input end of the synchronizing signal generator circuit 64. The horizontal synchronizing pulse output end of the synchronizing signal generator circuit 64 is connected to the other end of the phase detector 65. The output end of the phase detector 65 is connected to the input end of the filter 66, and the output end of the filter 66 to the input end of the VCO 67. The output end of the VCO 67 is connected to the clock input end of the synchronizing signal generator circuit 64, one of the two input ends of the signal identifying circuit 56 and the clock input ends of the variable delay circuit 60, microcomputer 7, camera signal processor circuit 51 and Y/C separation/demodulation circuit 57. The output end of the pixel synchronizing signal separator circuit 63 is connected to the data input end of the latch 70 and the other end of the signal identifying circuit 56. The output end of the signal identifying circuit 56 is connected to the control input end of the switching circuit 58 and the microcomputer 7. The output end of the latch 70 is connected to the input end of the microcomputer 7, and the output end of the variable delay circuit 60 to the clock input ends of the latch 70 and A/D converter circuit 50. The output end of the A/D converter circuit 50 is connected to the input ends of the camera signal processor circuit 51 and Y/C separation/demodulation circuit 57. The output ends of the camera signal processor circuit 51 and Y/C separation/demodulation circuit 57 are connected to the switching circuit 58 so that one of the signals therefrom can be selected by the switching circuit. The microcomputer 7 is connected to the camera signal processor circuit 51, Y/C separation/demodulation circuit 57, synchronizing signal generator circuit 64 and variable delay circuit 60 so that it can control them. The microcomputer is also connected to the serial communication interface 71 so that data can be transmitted through the interface to the outside.

In this embodiment, the horizontal and vertical synchronizing signals are separated from the input signal, and the phase detector 65 compares the phase of the separated horizontal synchronizing signal and that of the horizontal-period pulse from the synchronizing signal generator circuit 64. The phase detector 65 generates a clock to be fed to the synchronizing signal generator circuit 64, and makes vertical synchronization by use of the separated vertical synchronizing signal. The filter 66 changes the frequency characteristic of the loop along the flow. The clock generated from the VCO 67 is used as a main clock for the chrominance/luminance signal generator unit 6. In addition, the microcomputer 7 compares the phase of the separated pixel synchronizing signal with that of the main clock, and controls the variable delay circuit 60 so that the A/D converter 50 can make timely conversion. The signal identifying circuit 56 discriminates the kinds of input signals, and controls the switching circuit 58 to switch the output signals from the camera signal processor circuit 51 and Y/C separation/demodulation circuit 57. The microcomputer 7 also controls the camera signal processor circuit 51 and Y/C separation/demodulation circuit 57 to operate for high picture quality, and it receives information of pixel number from the camera head unit and supplies the clock count to the synchronizing signal generator circuit 64 so that it can operate to match the connected camera head unit.

In this embodiment, since the A/D conversion timing is controlled by the pixel synchronizing signal, the analog signal can be always converted into a digital signal with the phase maintained optimum, providing correct color. Moreover, since the signal identifying circuit 56 decides the kind of the input signal from the frequency components of the pixel synchronizing signal, and supplies the result to the microcomputer, the A/D conversion timing is never disturbed even when the television signal is fed. This embodiment has substantially the same effect as the first embodiment.

What is claimed is:
1. A camera system comprising:
 a first unit including at least an image pickup device, a timing generator circuit for generating timing for driving said image pickup device, a synchronizing signal generator circuit for generating synchronizing signals in accordance with the timing of said timing generator circuit, an adder circuit for adding an output signal from said image pickup device and the synchronizing signals generated from said synchronizing signal generator circuit, and an output means for sending out in a dot-sequential manner the output signal that is fed from said image pickup device and added with said synchronizing signals;

a second unit including an input means for receiving signals from the outside, an identifying circuit for deciding whether the signal received through said input means is the output signal from said first unit or a television signal, a first signal processor circuit for making a chrominance signal and a luminance signal be generated from the output signal which said first unit produces, a second signal processor circuit for making a chrominance signal and a luminance signal be generated from said television signal, and a switching circuit for switching said first and second signal processor circuits in accordance with a result from said identifying circuit; and a connector unit for detachably connecting said first and second units and sending both said television signal and said dot-sequential signal from said first unit to said second unit.

2. A camera system according to claim 1, wherein another switching circuit for selecting an arbitrary signal is provided between said first and second units.

3. A camera system according to claim 1, wherein said synchronizing signals to be added in said first unit are horizontal and vertical synchronizing signals or synchronizing signals including horizontal and vertical synchronizing signals and a synchronizing signal indicating the pixel period of said image pickup device.

4. A camera system according to claim 1, wherein said input means is an input terminal through which both said television signal and said dot-sequential output signal from said first unit can be supplied to said second unit.

5. A camera system according to claim 1, wherein said identifying circuit makes decision from a synchronizing signal indicative of a pixel period added to said dot-sequential output signal or the frequency of the burst portion of said television signal.

6. A camera system according to claim 1, wherein said horizontal and vertical synchronizing signals added by said adder circuit are based on the same specifications as those added to said television signal.

7. A camera system according to claim 1, wherein said first unit further includes a gain control circuit for making the level of the output signal from said image pickup device equal to that of said television signal.

8. A camera system according to claim 7, wherein said gain control circuit detects the level of the output signal from said image pickup device and changes its signal gain in accordance with the detected signal level.

9. A camera system according to claim 7, wherein said first unit further includes an iris detector circuit for detecting the amount of light incident to said image pickup device and an iris drive circuit for driving an iris in accordance with the detected amount of incident light.

10. A camera system according to claim 1, wherein said second unit further includes a timing control circuit for controlling the timing at which said input signal is converted into a digital signal in response to a synchronizing signal of a pixel period added to said input signal or a burst signal.

11. A signal processor comprising:

first signal processing circuit means for generating a chrominance signal and a luminance signal from a dot-sequential output signal produced from a unit including an image pickup device;

second signal processing circuit means for generating a chrominance signal and a luminance signal from a television signal;

input means for receiving a signal from the outside;

an identifying circuit for deciding whether said signal received by said input means is said television signal or said dot-sequential output signal from said unit including said image pickup device; and a switching circuit for switching said first and second signal processing circuit means in accordance with the result from said identifying circuit, wherein said input means receiving both said television signal and said dot-sequential output signal from said unit including said image pickup device.

12. A signal processor according to claim 11, further comprising another switching circuit for selecting one of both said television signal and said output signal from said unit including said image pickup device.

13. A signal processor according to claim 11, wherein said input means is an input terminal through which said television signal and said dot-sequential output signal from said unit including said image pickup device are supplied to said signal processor.

14. A signal processor according to claim 11, wherein said identifying circuit makes decision from a synchronizing signal indicative of a pixel period added to said dot-sequential output signal from said unit including said image pickup device or the frequency of the burst portion of said television signal.

15. A signal processor according to claim 11, further comprising a timing control circuit for controlling the timing at which the signal passed through said input means is converted into a digital signal in response to a synchronizing signal of a pixel period added to said dot-sequential output signal from said unit including said image pickup device or the burst signal of said television signal.

* * * * *